P. ROGER.
HORIZONTAL TWIN OVENS.
APPLICATION FILED APR. 26, 1915.
1,188,208.
Patented June 20, 1916.
2 SHEETS—SHEET 2.
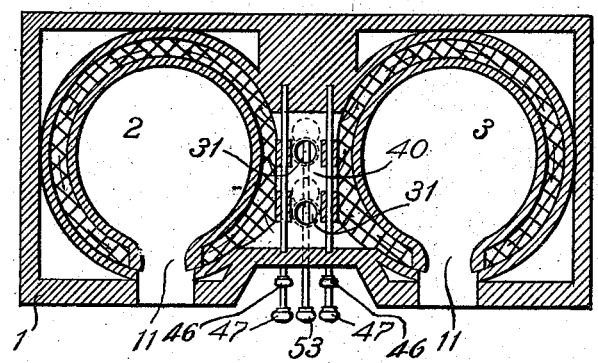
Fig. 6.
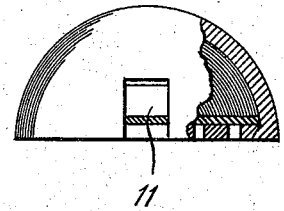
Fig. 4.
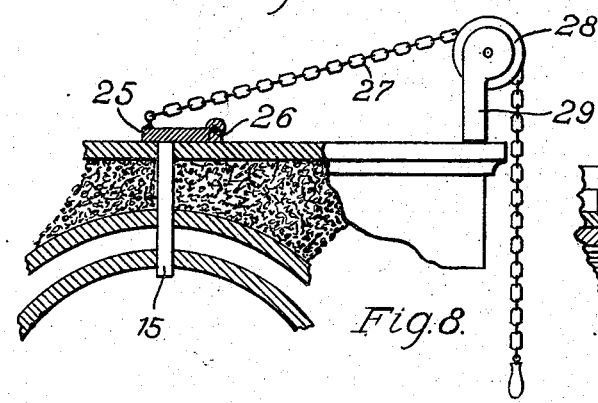
Fig. 7.
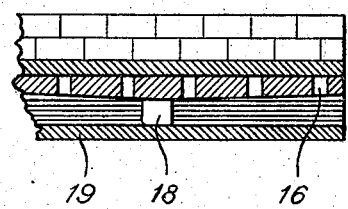
Fig. 8.
Fig. 9.
Fig. 5.
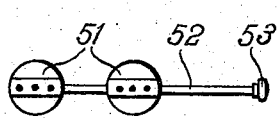
Fig. 10.
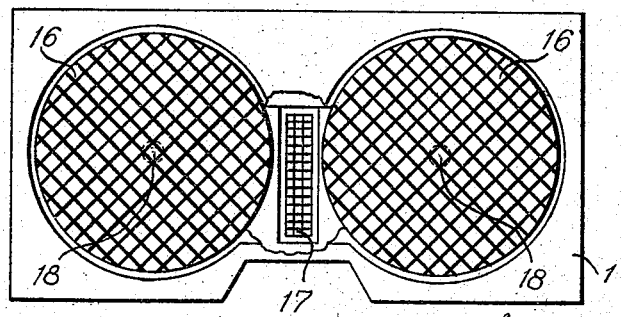
Inventor
Peter Roger

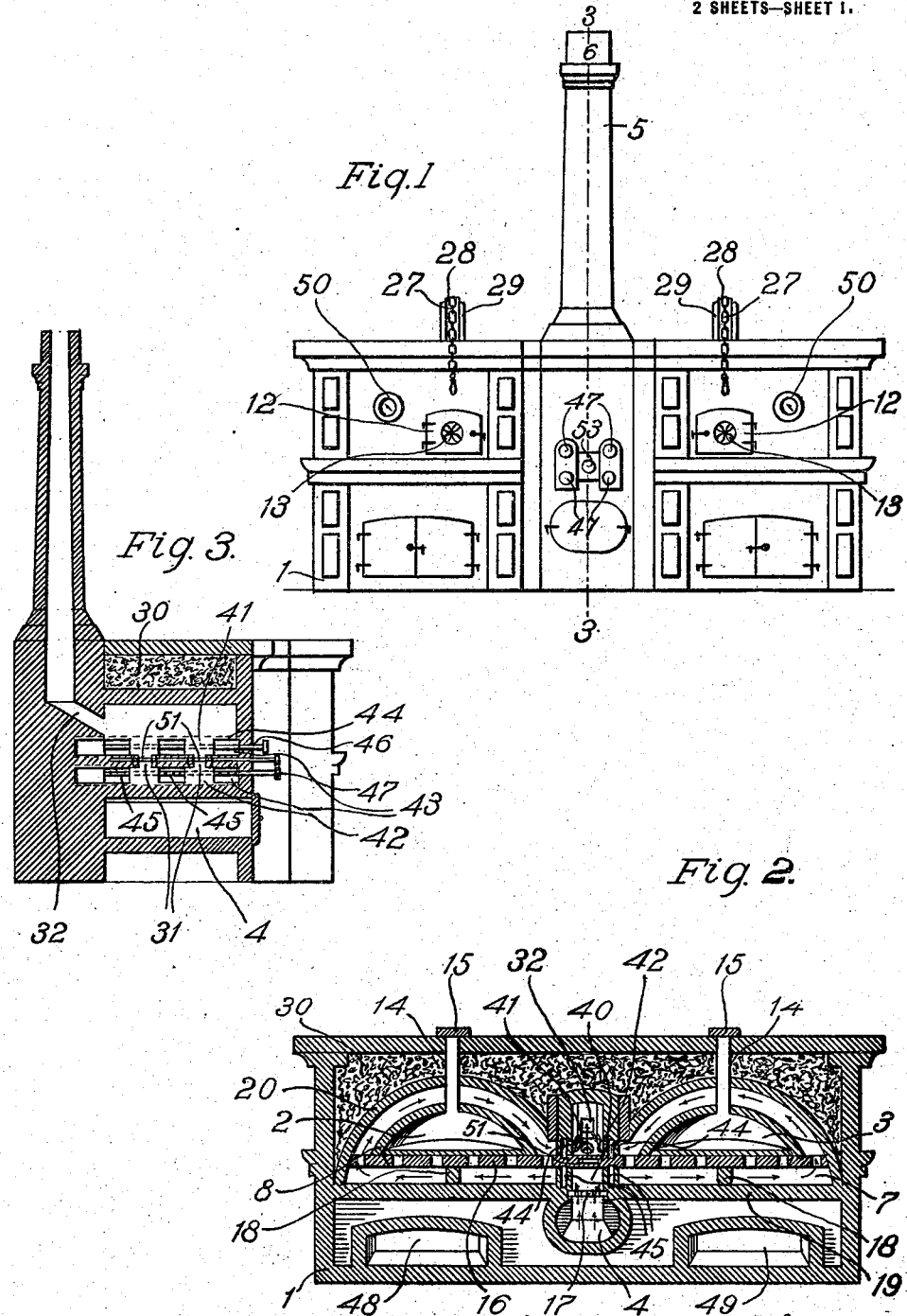

UNITED STATES PATENT OFFICE.

PETER ROGER, OF MILFORD, MASSACHUSETTS.

HORIZONTAL TWIN OVENS.

1,188,208. Specification of Letters Patent. Patented June 20, 1916.

Continuation of application Serial No. 793,495, filed October 4, 1913. This application filed April 26, 1915. Serial No. 24,242.

*To all whom it may concern:*

Be it known that I, PETER ROGER, a citizen of the United States, resident of Milford, county of Worcester, State of Massachusetts, have invented an Improvement in Horizontal Twin Ovens, of which the following description, in connection with the accompanying drawing, is a specification, like characters on the drawing representing like parts.

This invention relates to improvements in horizontal twin ovens for baking bread, and the primary object of the invention is to provide an oven as specified, consisting in a pair of ovens, having a furnace or fire box positioned intermediate their facing sides, and also a single chimney having communication with the fire box and the air spaces, to insure the proper circulation of air within the said spaces during baking in the chambers.

Another object of this invention is to provide an oven as specified wherein a minimum amount of fuel is necessary for producing bread or pastry of uniform color in a short space of time, as is consistent with the efficient and hygienic baking of the bread or pastry.

With the foregoing and other objects in view, this invention consists in such novel features of construction, combination and arrangement of parts as will be hereinafter more fully described and illustrated in the accompanying drawings, and claimed.

In describing the invention in detail, reference will be had to the accompanying drawings wherein like characters designate like or corresponding parts throughout the several views, and in which, Figure 1 is a front elevation of the complete oven structure, Fig. 2 is a transverse vertical sectional view through the central portion of the ovens, illustration of the chimney having been omitted, Fig. 3 is a vertical sectional view through the chimney and fire box, Fig. 4 is a horizontal sectional view in a plane slightly above the bottom of the ovens, Fig. 5 is a fragmentary plan view of the partition which supports the oven and which separates the lower portion of the circulating chamber from the flue portions being broken away and omitted to disclose parts below same, Fig. 6 is a detail view of one of the ovens a portion of the wall of the ovens being broken away showing the structure in section, and, Fig. 7 is an enlarged view of a portion of the lower part of the oven showing the means for supporting the base thereof. Fig. 8, is a detail view of the dampers used in the baking chambers, Fig. 9, is a detail view of the dampers which control the air spaces and means for operating the same, and Fig. 10, is a detail view of the dampers which control the direct communication between the furnace and the chimney.

Referring more particularly to the drawings, 1 designates the supporting structure of the horizontal twin ovens, which consists of baking ovens 2 and 3, positioned above and upon opposite sides of the fire box or furnace 4.

The structure 1 has supported thereon a stack or chimney 5, the opening or bore 6, of which extends angularly through the structure 1, and communicates with the fire box or combustion chamber 4, through suitable openings 31 in the partition between the combustion chamber 4 and the stack chamber when starting the fire or when it is not desired to heat the ovens.

The ovens or baking chambers 2—3 are substantially of inverted hemispherical form, the walls and base of such chambers being made of fire brick or other fire proof material. The bases of the ovens are supported upon grates 16 corresponding substantially in contour and size to that of the bottom of the baking chambers. These grates are supported at their edges adjacent the combustion chamber by means of the substantially solid transverse partition the sides of which extend within each of the arched inclosures containing the baking ovens. This substantially solid partition effectuates the division of the heat distributing chamber 40 into upper and lower portions. This substantially solid partition, further, is formed with the apertures 31 for the closure of which are provided the manually operable dampers 51. The grates 16 have each a centrally disposed lug 18 which rests upon the partition floor 19. By thus supporting the bottoms of the ovens upon grates a thinner layer of fireproof material may be provided which will permit a more rapid heating of the interior of the oven. The grates 16 are of the same circumferential diameter as the outer walls 20 of the circulating chambers so that there is an annular series of openings leading from the horizontal portion 7 of the circulating chamber to the dome shaped portion, thus providing for the free circulation of the heated gases of combustion around the entire oven. Access to the interior of the ovens is gained through the openings 11, formed near the base, at one side of the ovens, which communicate with the exterior of the structure 1, and are closed by suitable doors 12. The doors 12 have dampers 13, positioned therein, for permitting the ingress of fresh air into the ovens or baking chambers 2 and 3, for properly regulating the temperature thereof. The structure 1 is provided with openings 14, formed therein, which extend vertically therethrough, and have pipes 15, mounted therein. The pipes 15 extend through the walls of the ovens or baking chambers, and provide for the outlets of air from the chambers.

The outlets of the pipes 15 are controlled by a hinged or pivoted damper 25, which is pivoted between ears 26, formed upon the upper surface of the structure 1. The pivoted dampers 25, have flexible members 27, connected therein, which flexible members pass over guiding pulleys 28, and depend in front of the structure 1, as is clearly shown in Fig. 1 of the drawings.

The guiding pulleys 28 are supported by suitable brackets 29, which are secured to the structure 1, in any suitable manner.

The structure 1 is hollow about the fire brick walls 20, and this hollow space is filled with cinders or any analogous substance shown at 30 in Fig. 2 of the drawings, which tends to retain heat and maintain a maximum amount within the air space 7, upon the utilization of a minimum amount of fuel.

The grate 17, which is positioned between the communicating opening of the combustion chamber 4 and the solid partition of the openings 31, tends to prevent small cinders or the like from passing upwardly into the spaces beneath and above the solid partition, and the flue 32. The openings 31 tend to discharge the heated air into the chimney, when heat is not needed in the air spaces 7. The openings 31 have slidably seated therein the dampers 51 of which the projecting knob 53 is clearly visible between the knobs 47 on the front side of the structure 1.

The space 40 between the two air spaces 7 which surrounds the ovens 2 and 3, respectively, is provided with a plurality of upstanding partitions 41 and 42, which partitions are provided with transversely extending openings 43, providing a communication between the furnace 4 and the two air spaces 7.

The partitions 41 and 42 are provided with slots 44, in which are slidably seated the dampers 45. The rods 46 project out of the forward side of the structure 1, and have knobs or heads 47, formed thereupon, for the manual sliding or manipulation of the dampers, for regulating the flow of the heated air from the combustion chamber 4 into the air space 7, and from this into the chimney; and if so desired, completely cutting off the aforesaid communication.

The structure 1 is provided with the chambers 48 and 49, which are positioned beneath the ovens or baking chambers 2 and 3, and may be utilized for holding the utensils used in the combustion chamber 4. The structure 1 supports thermometers 50, which are provided for visual designation of the temperature of the air within the space 7.

In the operation of the device when a direct draft is desired, as in starting a fire, or when it is desired to prevent the heated gases from circulating about the baking chambers 2 and 3 the handle 53 of the dampers 51 is pushed inwardly so that the dampers 51 assume the positoin shown in dotted lines in Fig. 4, uncovering the openings 31 so that the products of combustion pass directly from the fire box 4 through the horizontal grating section 17 through the flue 32 and directly to the stack 5. In the meantime the dampers 46, 47 are drawn out so as to close the apertures 43, which communicate with the circulation passages about the ovens. When it is desired to heat the ovens the damper 53 is drawn out so as to close the aperture 31 which leads from the fire box directly to the stack. A lower damper 45 is then pushed in so as to open a communication between the fire box and the horizontal passage 7 of the circulating chamber, the upper damper 46 remaining closed. When in this position the hot gases rising from the furnace pass into the horizontal portion of the chamber 7 and are then permitted to rise into the dome shaped circulating chamber above the ovens, by reason of the peripheral apertures in the grate which permit a free circulation of the gases around the ovens. When it is desired to cool off the oven the lower dampers 47 are closed and the upper dampers opened, thus permitting the hot gases which surround the oven to pass into the flue and thence to the stack.

In this construction the gases do not circulate directly from the fire box around the oven and thence to the flue as is usual in stoves and baking furnaces but upon the contrary advance from the flue box beneath the grate 16 and from the horizontal chamber 17 rises into the dome shaped circulating chamber above and surround the ovens thus maintaining a gentle circulation rather than the rapid circulation usual in stoves. The heat is thus applied to the ovens substantially uniformly throughout so that the articles within the oven are baked with substantial uniformity throughout their entire surface.

It is obvious that the vertical dampers are capable of independent manipulation and therefore may be so arranged as to admit the heated gases to only one side of the oven structure; hence the baking chambers are capable of single as well as conjoint use.

I claim:

1. An oven comprising a structure having an inclosure therein, a baking chamber in said inclosure and spaced apart from the walls thereof, a reticulated support for the baking chamber in said inclosure, a heat distributing chamber to receive heat from a heating means and to direct the same to the structure exterior, means in said heat distributing chamber operable to open and close the direct passage, and means interposed between the distributing chamber and said baking chamber inclosure operable to admit the heat to circulate about the baking chamber.

2. An oven comprising a structure having a plurality of arched inclosures, baking chambers in said inclosures, means for supporting said chambers in the inclosures whereby substantially all portions of the chambers may be presented to heated gases admitted to the inclosure, a heat distributing chamber, means for supplying heated gases to said chamber, a partition in said heat distributing chamber having orifices therein to permit the passage of heated gases to the structure exterior, and dampers movably mounted in said partition to open and close the orifices, vertical partitions between said chamber and the arched inclosures said partitions being apertured to admit the heated gases to the arched inclosures whereby the gases may circulate about the baking chambers and heat the same, and dampers movably mounted in the vertical partitions to open and close the apertures.

3. An oven comprising a structure, a plurality of arched compartments therein, means for insulating said compartments against heat radiation, baking chambers in said compartments, a heat distributing chamber, a heat generating means communicating with said distributing chamber, a flue communicating with said distributing chamber and with the exterior of the structure, a platform extending transversely the structure, said platform comprising reticulated portions and an apertured middle portion, supports for the baking chambers formed by the reticulated portions, a partition for the distributing chamber formed by the middle portion, and dampers adapted selectively to open and close the apertures in the middle portion.

PETER ROGER.

Witnesses:
SHELLEY V. VINCENT,
BERTHA I. SNARE.